United States Patent [19]
Fell

[11] Patent Number: 5,621,171
[45] Date of Patent: Apr. 15, 1997

[54] METHOD FOR ACTIVELY BALANCING A VIBRATION STRUCTURE GYROSCOPE SENSING ELEMENT STRUCTURE

[75] Inventor: Christopher Fell, Plymouth, Great Britain

[73] Assignee: British Aerospace Public Limited Company, Hampshire, England

[21] Appl. No.: 628,451

[22] Filed: Apr. 5, 1996

[30] Foreign Application Priority Data

Apr. 7, 1995 [GB] United Kingdom ............... 9507253

[51] Int. Cl.⁶ .............................. G01P 9/04; G01C 19/56
[52] U.S. Cl. ........................ 73/504.13; 73/1.77; 73/1.82
[58] Field of Search ........................ 73/504.13, 504.12, 73/1 D, 1 V; 74/5 R, 5 D

[56] References Cited

U.S. PATENT DOCUMENTS 4,793,195 12/1988 Koning ................... 73/504.13
4,951,508 8/1990 Loper et al. ............... 73/1 D
5,445,007 8/1995 Varnham et al. ........... 73/1 DV

FOREIGN PATENT DOCUMENTS 2266588 11/1993 United Kingdom.

Primary Examiner—John E. Chapman
Attorney, Agent, or Firm—Cushman, Darby & Cushman IP Group of Pillsbury Madison & Sutro LLP

[57] ABSTRACT

A vibrating structure gyroscope sensing element structure of ring-like or substantially cylindrical form made of ferromagnetic material is actively balanced by applying a variable strength magnetic field across a predetermined section of the circumference of the sensing element structure differentially to shift the resonant frequency of one or the other of the primary and secondary vibration modes (1,2) thereof by an amount sufficient to bring the two mode resonant frequencies into balance.

3 Claims, 4 Drawing Sheets

5,621,171

METHOD FOR ACTIVELY BALANCING A VIBRATION STRUCTURE GYROSCOPE SENSING ELEMENT STRUCTURE

FIELD OF THE INVENTION

This invention relates to a method for actively balancing a Vibrating Structure Gyroscope sensing element structure of ring-like or substantially cylindrical form made of ferromagnetic material.

BACKGROUND OF THE INVENTION

Vibrating Structure Gyroscope sensing element structures are conventionally driven resonantly on the $\cos 2\theta$ mode with the ring or cylinder motion as shown schematically in FIG. 1 of the accompanying drawings over a single cycle. There are two modes of vibration supported on the ring or cylinder at a mutual angle of 45° as shown conventionally in FIG. 2 of the accompanying drawings in which the primary mode is shown at 1 and the secondary mode is shown at 2. For a perfectly symmetric structure the resonant frequencies of the two modes will be degenerate. However in practical devices there exists a frequency split ($\Delta f$) due to imperfections in the structure and material. These imperfections will lock the position of the vibration modes on the structure and in order to achieve optimum performance it is necessary to match these two frequencies to enable energy to couple efficiently between them.

One method has been proposed for balancing the frequencies of the primary and second modes of vibration by the controlled removal or addition of material from the resonant structure. Whilst this system is effective anisotropies and material imperfections will cause the frequency split ($\Delta f$) to vary with temperature. The scale factor and bias terms are directly influenced by the frequency split and will thus show temperature dependence. There is thus a need for a method for actively balancing a vibrating structure gyroscope sensing element structure of ring like or substantially cylindrical form made of ferromagnetic material.

OBJECTS OF THE INVENTION

Thus one object of the present invention is to provide an improved method for actively balancing a vibrating structure gyroscope sensing element structure.

This and other objects and advantages of the present invention will become more apparent from details disclosed in the following specification where preferred embodiments of the invention are described.

SUMMARY OF THE INVENTION

According to the present invention there is provided a method for actively balancing a Vibrating Structure Gyroscope sensing element structure of ring-like or substantially cylindrical form made of ferromagnetic material, in which a variable strength magnetic field is applied across a predetermined section of the circumference of the sensing element structure differentially to shift the resonant frequency of one or the other of the primary and secondary vibration modes thereof by an amount sufficient to bring the two mode resonant frequencies into balance.

Preferably the magnetic field is applied to the primary mode.

Conveniently the magnetic field applied reduces the mode resonant frequency of vibration in proportion to the field strength.

DESCRIPTION OF THE DRAWINGS

For a better understanding of the present invention, and to show how the same may be carried into effect, reference will now be made, by way of example, to the accompanying drawings in which.

DESCRIPTION OF EMBODIMENTS OF THE INVENTION

Figure 1:
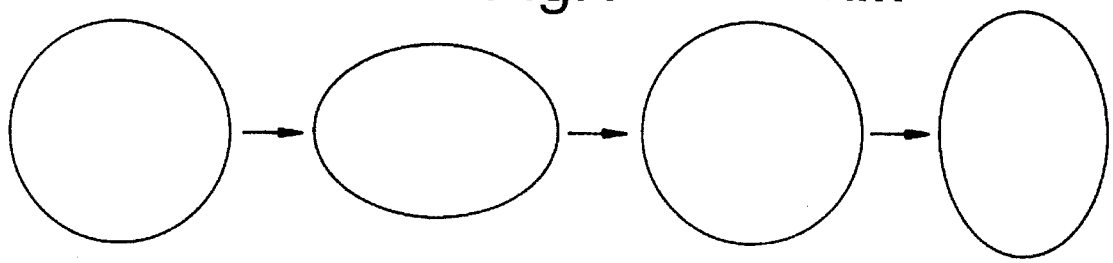
FIG. 1 is a schematic diagram of a single cycle of shape evolution for a conventional cylindrical or ring sensing element structure driven resonantly on the $\cos 2\theta$ mode.
Figure 2:
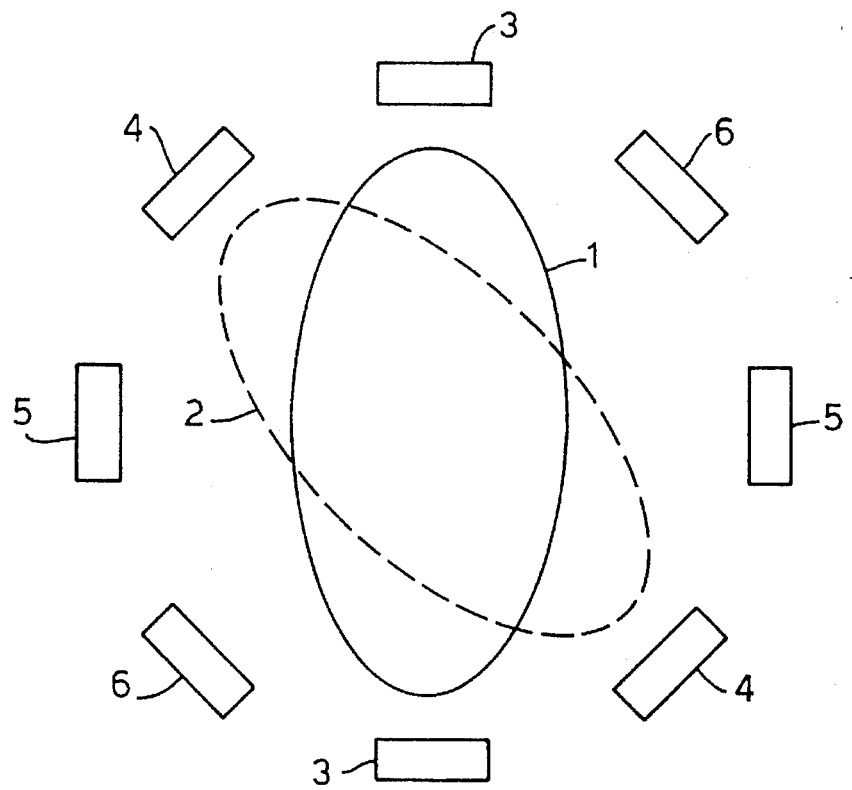
FIG. 2 is a diagrammatic illustration of the drive and pickup locations for a conventional system of $\cos 2\theta$ mode cylindrical or ring-like sensing element structure.

In the conventional $\cos 2\theta$ mode of resonant drive as shown in FIG. 2 of the accompanying drawings, two primary drive elements are shown at 3, two secondary drive elements are shown at 4, two primary pick-off elements are shown at 5 and two secondary pick-off elements are shown at 6. These are positioned conventionally as shown in FIG. 2. One mode of the vibrating sensing element structure, referred to as the primary mode 1 in which the mode alignment angle $\alpha=0°$, is aligned to the primary drive. The primary mode 1 is driven at constant amplitude with the primary pick-off signal used to lock onto the resonance maximum. In the absence of rate there will be no radial motion detected at the second pick-off element 6. Under rate input, Coriolis coupling causes the secondary mode 2 to be excited and the amplitude of the secondary pick-off signal contains the rate information. Under ideal conditions in which the frequency split $\Delta f=0$ Hz and $\alpha=0°$, the motion at the secondary pick-off elements 6 will be completely in phase with the primary pick-off motion at the pick-off elements 5.

Figure 3:
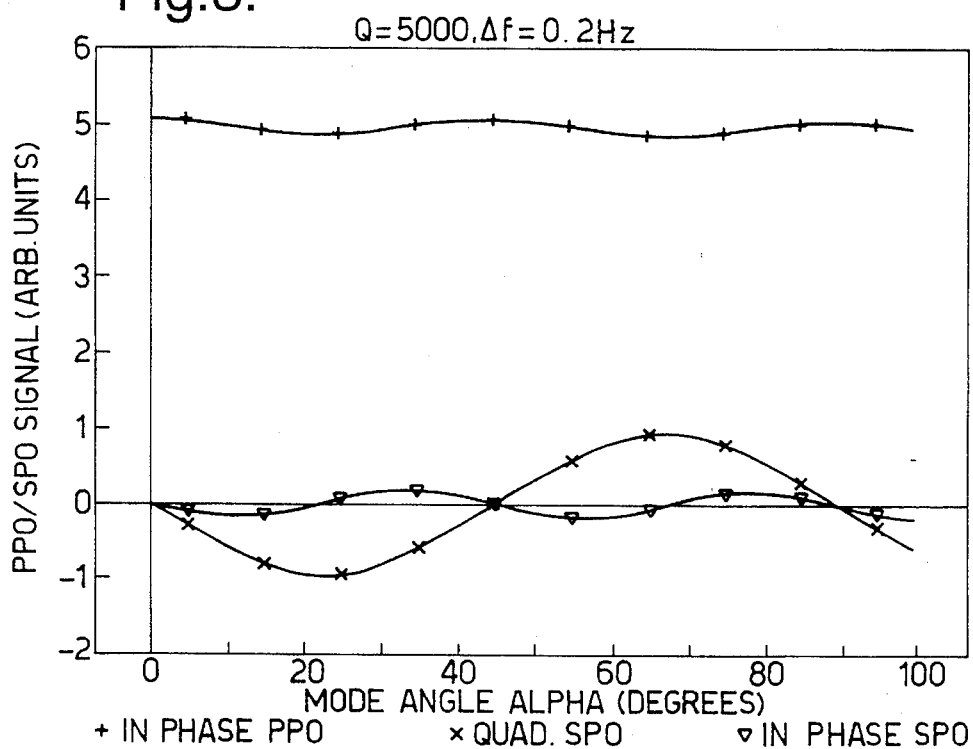
FIG. 3 is a diagrammatic representation of pick-off signal versus mode angle for the conventional system of FIGS. 1 and 2.

Variation of the pick-off signal phase components with $\alpha$ is shown for given vibrating structure parameters in FIG. 3 in which the signal levels are shown as a function of $\alpha$ for Q=5,000 and $\Delta f=0.2$ Hz. For $\Delta f=0$ Hz the secondary signals are 0 for all values of $\alpha$. In phase and quadrature bias go to zero when one of the modes is aligned to the drive ($\alpha=n\times 45°$). This is the normal set up condition for the conventional vibrating structure gyroscope.

Figure 4:
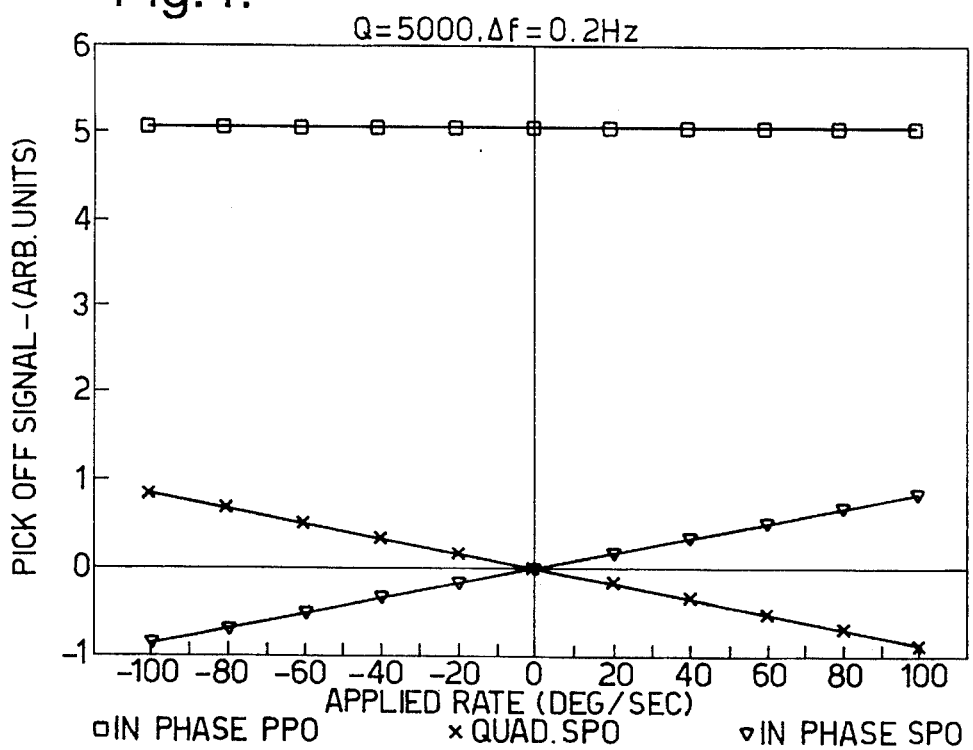
FIG. 4 is a graphical representation of pick-off signals plotted against applied rate for an open loop rate response for the conventional system of FIGS. 1, 2 and 3.

FIG. 4 shows the open loop rate response for $\alpha=0°$, $\Delta f=0.2$ Hz and Q=5,000. For $\Delta f=0$ Hz, the in phase response of the secondary pickup elements 5, which gives the rate output, is maximized with the quadrature being zero for all rates. In practical gyroscopes α will be non zero and machining tolerances will cause slight driver and pick-off misalignments. These will give rise to a standing bias and this bias and the rate response will vary with the frequency split Δf which is known to change with temperature. It is therefore desirable to actively null or stabilized the frequency split Δf over the operational temperature range of the gyrocope.

According to the method of the present invention a vibrating structure gyroscope sensing element structure of ring like or substantially cylindrical form and made of ferromagnetic material can be actively balanced by applying a variable strength magnetic field across a predetermined section of the circumference of the sensing element structure differentially to shift the resonant frequency of one or the other of the primary and second vibration modes thereof by an amount sufficient to bring the two mode resonant frequencies into balance. The application of the magnetic field to ferromagnetic material has the effect of changing its Youngs Modulus E to a small extent. The cos 2θ mode frequency of a ring or substantially cylindrical resonator is given by:

$$f_r = \sqrt{\frac{3Eh^2}{5(1-v^2)pR^4}} \quad (1)$$

where h is the resonator wall thickness, p is the density, R is the radius of the vibrating sensing element structure and v is the Poisson ratio of approximately 0.3. Perturbations to E shift the resonant frequency.

Figure 5:
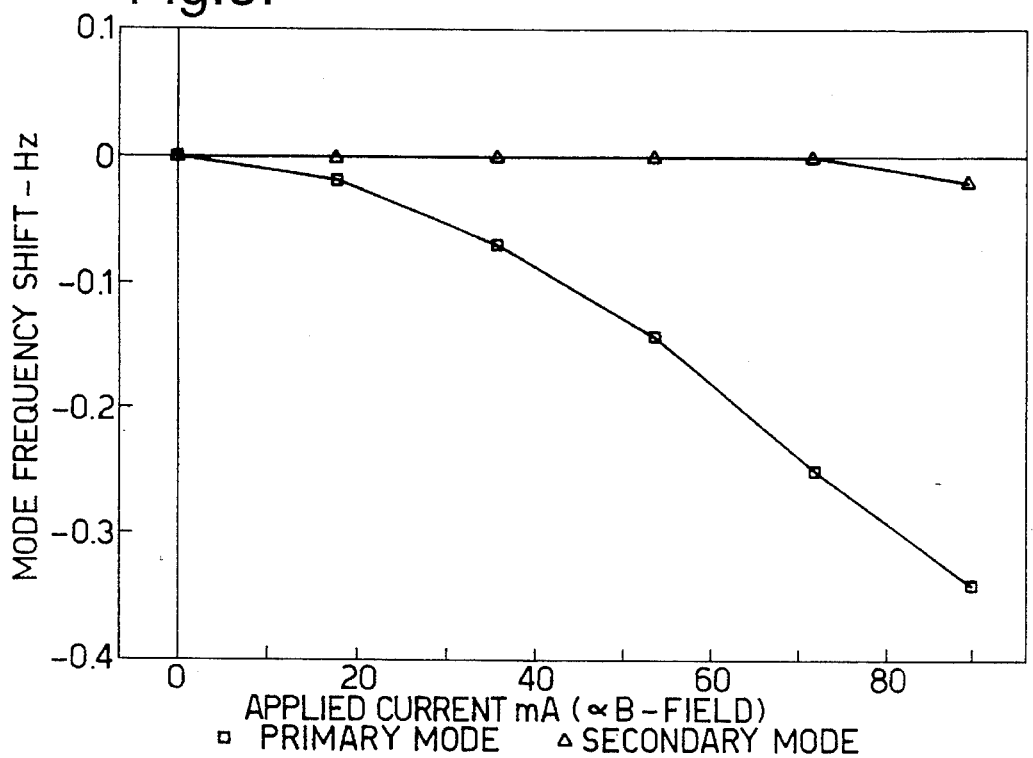
FIG. 5 is a graphical representation of mode frequency plotted against applied B field for the method of the present invention.
Figure 6:
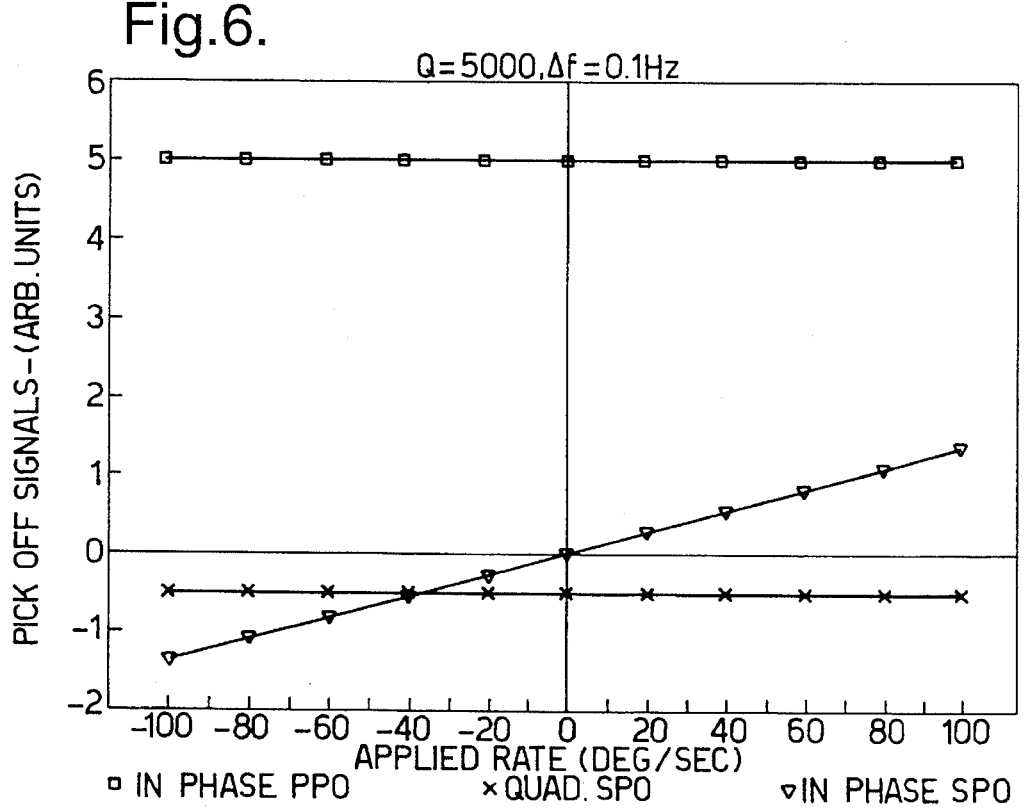
FIG. 6 is a graphical representation of pick-off signals plotted against applied rate for the method of the invention according to FIG. 5 at a frequency split value of 0.1 Hz.
Figure 7:
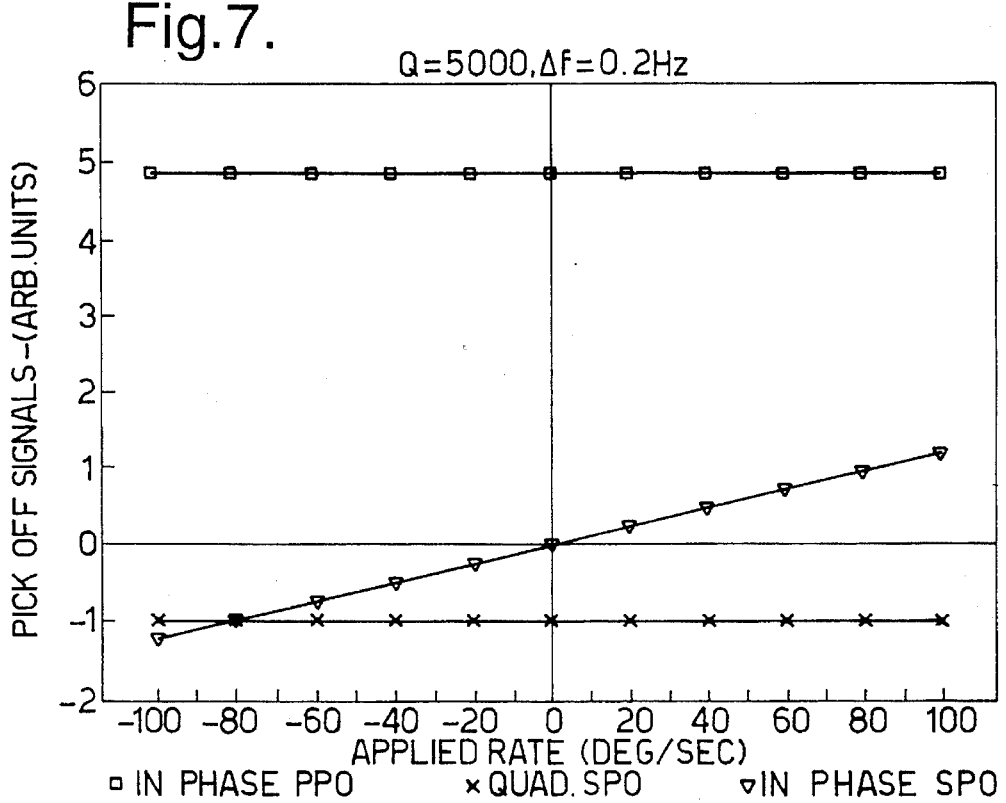
FIG. 7 is a graphical representation similar to that of FIG. 6 for pick-off signals plotted against applied rate but for a frequency split of 0.2 Hz.

FIG. 5 shows the variation in mode frequencies with the application of increasing magnetic field strength applied at the primary drive position 3 according to the invention. The magnetic field was produced using an inductive magnetic drive module and the field is proportional to the current flowing in the coil. The primary mode frequency shows a considerably larger shift.

In practical terms it is advisable to have an error signal related to the frequency split Δf to enable the frequency balancing loop to be locked. Advisably this error signal should be invariant under rate input. In a conventional system in which the mode is aligned to drive with α=0° or 45°, there is no secondary output in the absence of rate. Referring to FIG. 3 shows that if α is set to 22.5° the secondary in-phase signal is zero and the quadrature signal is a maximum.

However, according to one aspect of the present invention aligning the modes such that α=22.5° gives the result that the apparent resonance maximum appears at the mean value of the primary and second mode frequencies. The secondary pick-off quadrature signal is proportional to the frequency split Δf and shows no rate dependence. This can be used as the feedback signal to lock off the balancing loop. The application of the magnetic field via the magnetic drive 7 reduced the mode frequency. The magnetic field should therefore be applied to the primary or higher frequency mode 1 as shown in FIG. 8.

Figure 8:
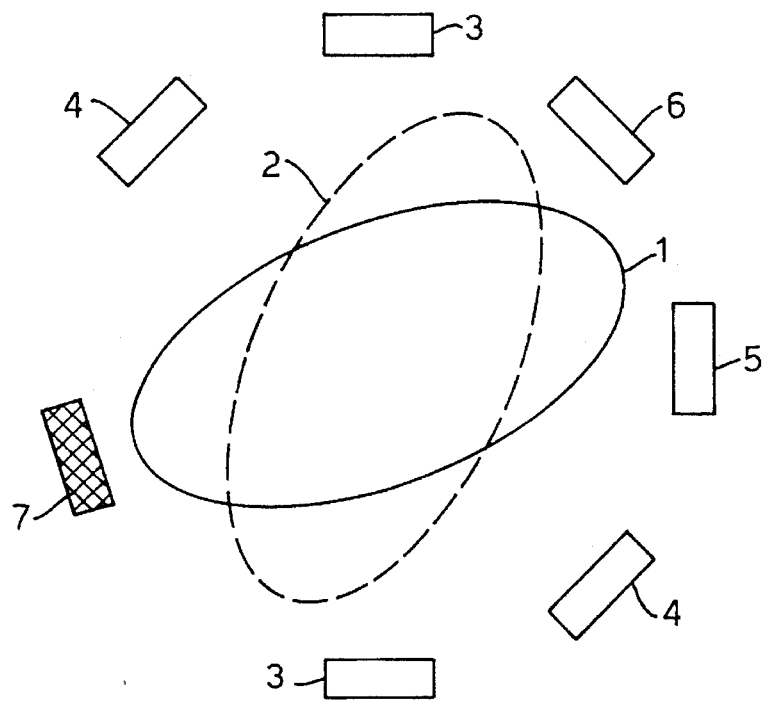
FIG. 8 is a view similar to that of FIG. 2 of a system according to the method of the present invention showing the arrangement of primary and secondary drive and pickup points with the addition of a magnetic drive.

In the FIG. 8 arrangement for use of the method of the present invention one primary pick-off element 5 and one secondary pick-off element 7 have been dispensed with and replaced by the magnetic drive element 7. As magnetic field strength is increased the secondary quadrature signal will reduce as the frequency split Δf becomes smaller. If the primary frequency is reduced below the secondary frequency the control signal will change sign indicating that a decrease in magnetic field is required. The frequency split Δf can be actively nulled and the mode frequencies balanced. This active balancing allows the mode frequency split to be nulled and the balance accuracy is maintained over the operational temperature range giving improved environmental performance for both bias and scale factor. In the graphical representation FIGS. 3, 4, 6 and 7, PPO represents primary pick off and SPO represents secondary pick-off.

Various modifications and alterations may be made to the embodiments of the present invention described and illustrated, within the scope of the present invention as defined in the following claims.

What is claimed is:

1. A method for actively balancing a Vibrating Structure Gyroscope sensing element structure of ring-like or substantially cylindrical form made of ferromagnetic material, in which a variable strength magnetic field is applied across a predetermined section of the circumference of the sensing element structure differentially to shift the resonant frequency of one or the other of the primary and secondary vibration modes thereof by an amount sufficient to bring the two mode resonant frequencies into balance.

2. Method according to claim 1 in which the magnetic field is applied to the primary mode.

3. Method according to claim 2, in which the magnetic field applied reduces the mode resonant frequency of vibration in proportion to the field strength.

* * * * *